United States Patent
Wammes

(10) Patent No.: US 6,340,385 B1
(45) Date of Patent: Jan. 22, 2002

(54) CLAY-CONTAINING MIXTURE OF DRY SOLIDS TO BE USED IN FORMING A MOISTURE RESISTANT GEL AND METHOD FOR TREATING A SURFACE

(75) Inventor: Jacobus Cornelis Wammes, Velddriel (NL)

(73) Assignee: Trisoplast International B.V. (NL)

( * ) Notice: Subject to any disclaimer, the term of this patent is extended or adjusted under 35 U.S.C. 154(b) by 0 days.

(21) Appl. No.: 09/486,957

(22) PCT Filed: Sep. 2, 1998

(86) PCT No.: PCT/NL98/00500

§ 371 Date: Mar. 3, 2000

§ 102(e) Date: Mar. 3, 2000

(87) PCT Pub. No.: WO99/11732

PCT Pub. Date: Mar. 11, 1999

(30) Foreign Application Priority Data

Sep. 4, 1997 (NL) .............................................. 1006935

(51) Int. Cl.[7] .................. C09K 17/00; C09K 17/40; C09K 17/42

(52) U.S. Cl. ............... 106/287.17; 106/468; 106/487; 106/284; 106/900; 71/64.09; 71/903; 405/263; 405/265; 524/445; 524/447

(58) Field of Search ................................ 106/468, 487, 106/287.17, 284, 900; 524/445, 446, 447; 405/263, 264, 265; 501/141; 71/64.09, 903

(56) References Cited

U.S. PATENT DOCUMENTS

| 5,120,344 A | | 6/1992 | Libor et al. ..................... 71/27 |
| 5,464,473 A | * | 11/1995 | Shiao ........................ 405/128 |
| 5,604,168 A | * | 2/1997 | Libor ........................ 106/900 |

FOREIGN PATENT DOCUMENTS

| EP | 244 981 A2 | 4/1987 |
| EP | 335 653 A1 | 3/1989 |
| FR | 2.127.991 | 3/1972 |
| GB | 1 439 734 | 6/1976 |
| WO | WO 94/18284 | 8/1994 |
| WO | WO 99/11732 | 3/1999 |

\* cited by examiner

*Primary Examiner*—Michael Marcheschi
(74) *Attorney, Agent, or Firm*—Seed Intellectual Property Law Group PLLC

(57) ABSTRACT

A clay-containing mixture of dry solids to be used in forming a moisture-resistant gel, and a method for directly forming a moisture-resistant gel on a surface to be treated, using such a mixture. The present invention furthermore relates to the use of such a mixture.

14 Claims, No Drawings

CLAY-CONTAINING MIXTURE OF DRY SOLIDS TO BE USED IN FORMING A MOISTURE RESISTANT GEL AND METHOD FOR TREATING A SURFACE

The present invention relates to a clay-containing mixture of dry solids to be used in forming a moisture-resistant gel, comprising powdery or ground smectite, possibly comprising at least 0.5% by weight of a powdery, solid activator, more than 0.2% by weight of a water-soluble polymer, and more than 0.5% by weight of one or more solid inert fillers, wherein all weight percentages are based on the amount of smectite in the mixture. The present invention furthermore relates to a method for directly forming a moisture-resistant gel on a surface to be treated, using such a clay-containing mixture of dry solids, and also to the use of such a clay-containing mixture of dry solids.

Such a clay-containing mixture of dry solids to be used in forming a moisture-resistant gel is known from International patent application WO 94/18284. According to said international patent application, a moisture-resistant, water-impervious gel is formed when the clay-containing mixture of dry solids comes into contact with water or with a liquid which contains water. Said formation of a gel is the result of physical-chemical processes (swelling, dissolution, ion-exchange, diffusion, chemical reactions and the like) which require the presence of water. The gel which is obtained forms a coherent structure, wherein the solid fillers are completely incorporated in the gel. The fillers which are used in said international patent application comprise hydrophilic fillers, such as ground solid mineral waste, for example ground concrete or ground bricks, tiles and ceramics. In addition, construction waste is mentioned as a suitable hydrophilic inorganic filler to be used in forming a moisture-resistant gel. The mixtures containing hydrophilic fillers that are described in said international patent application have a low smectite content, namely about 3% (example 2), 2.5% (example 3) and 5% (example 5).

If hydrophobic fillers are present, such a claycontaining mixture of dry solids to be used in forming a moisture-resistant gel may be improved by ensuring that the formation of a coherent gel is possible. If the gel which is formed does not have such a structure, the water seal provided by the layer of gel will be inadequate, as a result of which water can pass through the layer of gel. It has become apparent that if the composition as described in international patent application WO 94/18284 is used, wherein the hydrophilic filler is substituted for a hydrophobic filler, the formation of the gel will only take place with the hydrophilic components of the mixture, whilst the hydrophobic filler particles will be present outside the gel structure in the form of small, discrete domains. The gel structure thus obtained will not exhibit a coherent character but a network-like character, as a result of which the water-sealing properties of the layer of gel will be completely lost.

The object of the present invention is to provide a clay-containing mixture of dry solids to be used in forming a moisture-resistant gel, in which clay-containing mixture the presence of a hydrophobic filler enables the formation of a coherent gel structure which exhibits excellent water-sealing properties.

The present invention as referred to in the introduction is characterized in that a clay-containing mixture of dry solids is used, wherein at least 10% by weight of the filler is made up of a hydrophobic filler, on basis of the total amount of filler, wherein the amount of smectite of the eventual mixture is 10–30% by weight, and wherein the water-soluble polymer has a molecular weight of at least 1 million. In principle, any solid hydrophobic filler is suitable for being used as the hydrophobic filler, but it is particularly preferred to use hydrophobic solid waste flows, which are harmful for the environment and which must be isolated. The use of such waste flows will not only solve the problem of recycling such waste flows, but it also helps to prevent the environmental pollution which is caused by such waste flows, since the coherent gel structure obtained in accordance with the present invention completely isolates the hydrophobic fillers that are used. Thus, the hydrophobic filler is fixed in the gel structure that is formed, as a result of which exchange with the environment is rendered impossible. Preferred hydrophobic fillers to be used in the clay-containing mixture of dry solids according to the present invention comprise at least one material selected from polymers, resins, tars and cokes, which products mainly originate from the heavy industry and the petrochemical industry, in particular the plastics and petrochemical industry. Other suitable hydrophobic fillers to be used are the waste products that are formed in sand casting processes, in particular moulding sand from foundries, which waste products, in addition to cokes, organic binders and resin-coated sand particles (hydrophobic particles), may comprise a considerable amount of hydrophilic sand, burned clay minerals, and possibly bentonite. Moulding sand is an example of a possible filler which consists of a core of a hydrophilic material and a coating of a hydrophobic material. As a result of the presence of said coating, moulding sand may be considered to be a hydrophobic material. For the calculation of the amount of hydrophobic filler, the total weight of the moulding sand is considered to be a hydrophobic material. Although such a filler contains hydrophilic components besides hydrophobic ones, this does not interfere with the gelling process, and such hydrophilic particles are fully incorporated into the gel structure that is formed. When using the clay-containing mixture according to the invention, it is possible to use 20% by weight and more of a hydrophobic filler in the inert filler.

In a preferred embodiment of the clay-containing mixture of dry solids according to the present invention, the amount of smectite of the eventual mixture is 12–15% by weight. For example, the following materials may be used as smectite-containing materials: montmorillonite, beidellite, hectorite, saponite, illite, allevardite, mixtures thereof or artificial mixtures of silicate compounds of the smectite type (namely LAPONITE (brand name), Laporte Co., Great Britain). Also natural stone types which contain smectite, such as bentonite, may also be used as starting materials containing an amount of smectite according to the above-described smectite content. If the filler to be used possesses a particular smectite content by itself, which is in particular the case with waste flows from the sand casting process, the amount of smectite thereof is also taken into account when calculating the total smectite content.

The smectite may be present in an active or in an inactive form in the clay-containing mixture of dry solids according to the present invention. The term inactive smectite types is understood to mean types of smectite wherein the sodium, potassium and/or lithium ions of the lattice do not constitute more than 30% of the sum of the exchangeable lattice cations. Such inactive smectite types require the use of an activator for opening the lattice structure thereof. Although active smectite types do occur in nature, natural smectite sources thereof are scarce and most smectite types that occur in nature are inactive smectite types. If active smectite types are used, the presence of activators is not required. Any water-soluble sodium, potassium or lithium salt may be used as the activator, whereby the anion of the salt in question forms with alkaline-earth metals an insoluble deposit. Examples of such activators are sodium carbonate, sodium phosphate and polyphosphate compounds, potassium carbonate, potassium phosphate and polyphosphate compounds, lithium carbonate, lithium phosphate and mixtures thereof, wherein sodium carbonate is especially preferred. The activator is generally present in the form of a powdery solid in an amount of up to 10% by weight, based on the amount of smectite, preferably 1.0–6.0% by weight. In certain embodiments it is preferred to use inactive smectite in order to obtain a satisfactory build-up of the gel structure formed by a reaction between polymer components, smectite and fillers.

In a preferred embodiment of the clay-containing mixture of dry solids to be used in forming a moisture-resistant gel, the molecular weight of the water-soluble polymer ranges between 7 million and 10 million. If the molecular weight is less than 1 million, the coherent gel structure is inadequate, which, in practice, has an adverse effect on the water-sealing properties of the gel that is formed. Examples of preferred polymers are polymers which contain —COOH, —COO$^-$Me$^+$ (Me$^+$ is a monovalent metal cation), —CONH$_2$, —OH and/or =C—O—C=groups as functional groups, such as polyacrylamide having a degree of hydrolysis of maximally 40%, polymethacrylamide, acrylamide-acrylic acid copolymer, vinyl alcoholacrylic acid copolymers, polyethylene oxide and mixtures thereof. Furthermore it is possible to use grafted polymers, such as acrylamide grafted on a cellulosis backbone. The polymer is preferably present in the eventual mixture in an amount of 0.6% by weight or more, preferably 1.2% by weight or more, based on the amount of smectite. In an especially preferred embodiment, the amount of polymer in the mixture is 1.2–3% by weight, based on the amount of smectite.

The clay-containing mixture of dry solids according to the present invention is prepared by simply homogenizing the individual components. The mixing sequence of the individual components is not critical, and said homogenization may also be carried out in steps.

The clay-containing mixture of dry solids according to the present invention can be stored for a prolonged period of time if contact with moisture is avoided. The mixture of dry solids can be applied to horizontal or slightly sloping surfaces by means of usual apparatus. Moreover, the mixture of dry solids according to the present invention is suitable for being used for filling tears or hollow spaces. After the dry mixture of solids has been applied, it may be moistened with water so as to cause gelling, but in particular embodiments it is desirable to leave the applied mixture of dry solids untreated as such, after which the desired gelling will take place by exposure to rain, natural or artificial seeping through of water and the like. In certain embodiments it is preferred to moisten the clay-containing mixture of dry solids according to the present invention with water in advance, after which the pre-moistened mixture is applied to the surface to be treated. It is also possible, however, to apply the clay-containing mixture of dry solids according to the present invention by using a gas flow or a liquid flow under high turbulence. In such an embodiment, the mixture is mixed with a gas flow or a liquid flow and thus sprayed onto the surface to be treated. An elastic layer exhibiting an excellent adhesion can be formed by using such techniques. In addition, such layers can be combined with concrete layers.

The clay-containing mixture of dry solids to be used in forming a moisture-resistant gel is in particular suitable for forming a water-impervious layer in foundations, civil structures and refuse storage sites. Moreover, the gel formed of the clay-containing mixture of dry solids is an excellent fixation material for the hydrophobic fillers present therein, thus preventing any exchange between the hydrophobic fillers and the environment.

The present invention will now be described in more detail with reference to the accompanying examples. It should be understood, however, that the present invention is by no means limited to such special examples.

EXAMPLE

An amount of 100 g of a waste flow from the sand casting process consisting of 70% by weight of coarse sand fraction (15% by weight of this fraction is free bentonite which is not coated with a resin, the amount of smectite of which is 60%), 15% by weight of medium sand fraction (comprising about 80% by weight of free bentonite having a smectite content of 60%, the remaining amount being cokes and resins) and 15% by weight of fine sand fraction (mainly consisting of cokes containing a small amount of bentonite), was mixed with 2.5 g of a bentonite mixture consisting of 30% by weight of highly active bentonite (comprising 7% of Na$_2$CO$_3$, smectite content: 70% by weight) and 70% by weight of inactive (Ca) bentonite (smectite content: 70% by weight) and 0.3 g of acrylic acid-acrylamide copolymer (average molecular weight: 10 million). The amount of smectite of the eventual mixture was 15% by weight. The mixture was homogenized, then moistened with 18 g of water, homogenized anew and poured onto a dry layer of sand present in a glass tube. The mixture thus moistened was slightly compressed so as to form a layer having a thickness of 3 cm, after which 40 cm of water was placed on top of the layer thus formed. This set-up was maintained for 6 weeks. After this period, the lower layer of sand was still completely dry, and no seepage of liquid through the layer of the wet mixture could be observed.

Comparative Example 1

The same amounts and components as described in example 1 were used, with this exception that the water-soluble acrylic acid-acrylamide copolymer had a molecular weight of 800,000. The obtained mixture was subsequently placed in a glass tube and water was placed on top of the layer thus formed. This set-up exhibited seepage of water after 2 days already, and after a period of 3 weeks the entire amount of water had seeped through the layer of gel.

Comparative Example 2

The same amounts and components as described in example 1 were used, with this exception that the eventual smectite content was 9.45%. The obtained mixture was placed in a glass tube and water was placed on top of the layer thus formed. Water drops were observed on the bottom layer after 3 days already, and after a period of 5 weeks all the water had seeped through the layer of gel.

What is claimed is:

1. A clay-containing mixture of dry solids to be used in forming a moisture-resistant gel, comprising powdery or ground smectite, more than 0.2% by weight of a water-soluble polymer, and more than 0.5% by weight of one or more solid inert fillers, wherein all weight percentages are based on the amount of smectite in the mixture, wherein at least 10% by weight of said inert filler is made up of a hydrophobic filler, based on the total amount of filler, wherein the amount of smectite in the mixture is 10%–30% by weight, and wherein the water-soluble polymer has a molecular weight of at least 1 million.

2. A clay-containing mixture of dry solids according to claim 1, wherein the amount of smectite in the mixture is 12%–15% by weight.

3. A clay-containing mixture of dry solids according to claim 1, wherein the molecular weight of said water-soluble polymer ranges between 7 million and 10 million.

4. A clay-containing mixture of dry solids according to claim 1, wherein at least 20% of said inert filler is made up of a hydrophobic filler.

5. A clay-containing mixture of dry solids according to claim 1, wherein said inert filler has a particle size of 0.05 mm–30 mm.

6. A clay-containing mixture of dry solids according to claim 1, wherein said water-soluble polymer is present in the mixture in an amount of at least 0.6% by weight, based on the amount of smectite.

7. A clay-containing mixture of dry solids according to claim 6, wherein said water-soluble polymer is present in the mixture in an amount of 1.2%–3% by weight, based on the amount of smectite.

8. A clay-containing mixture of dry solids according to claim 1, wherein said water-soluble polymer is selected from the group consisting of polyacrylamide having a degree of hydrolysis of at most 40%, acrylamide-acrylic acid copolymer and a polyethylene oxide having a molecular weight of at most 15 million.

9. A clay-containing mixture of dry solids according to claim 1, wherein the hydrophobic filler comprises at least one material selected from polymers, resins, tars and cokes.

10. A clay-containing mixture of dry solids according to claim 1, wherein the hydrophobic filler comprises a waste product obtained from a sand casting process.

11. A method for directly forming a moisture-resistant gel on a surface to be treated, using the clay-containing mixture of dry solids according to claim 1, wherein said mixture is applied to a surface to be treated by means of a turbulent gas flow or a turbulent liquid flow.

12. A method for forming a water-impervious layer in foundations, civil structures and refuse storage sites, the method comprising forming a gel from water and a mixture of dry solids comprising powdery or ground smectite, more than 0.2% by weight of a water-soluble polymer, and more than 0.5% by weight of one or more solid inert fillers, wherein all weight percentages are based on the amount of smectite in the mixture, wherein at least 10% by weight of said inert filler is made up of a hydrophobic filler, based on the total amount of filler, wherein the amount of smectite in the mixture is 10%–30% by weight, and wherein the water-soluble polymer has a molecular weight of at least 1 million; and applying said gel to a foundation, civil structure or refuse storage site.

13. The clay-containing mixture of claim 1 further comprising at least 0.5% by weight of a powdery, solid activator.

14. A clay-containing mixture of dry solids according to claim 1, wherein the amount of activator in the mixture is 1.0%–6.0% by weight, based on the amount of smectite.

* * * * *